United States Patent [19]

Claussen et al.

[11] Patent Number: 4,506,024

[45] Date of Patent: Mar. 19, 1985

[54] CERAMIC FORMED BODY WITH A HIGH CRACK ARRESTABILITY

[75] Inventors: Nils Claussen, Leonberg; Günter Petzow, Leinfelden-Echterdingen, both of Fed. Rep. of Germany

[73] Assignee: Max-Planck-Institut zur Foerderung der Wissenschaften e.V., Gottingen, Fed. Rep. of Germany

[21] Appl. No.: 528,466

[22] Filed: Sep. 1, 1983

[30] Foreign Application Priority Data

Sep. 6, 1982 [DE] Fed. Rep. of Germany ....... 3233019

[51] Int. Cl.$^3$ ............................................. C04B 35/00
[52] U.S. Cl. ................................... 501/105; 501/102; 501/103; 501/152; 264/56; 264/67
[58] Field of Search ...................... 501/104, 105, 1, 94, 501/98, 102–103, 152–154; 264/56, 67

[56] References Cited

U.S. PATENT DOCUMENTS

| | | | |
|---|---|---|---|
| 3,247,000 | 4/1966 | Taylor | 501/105 |
| 3,519,447 | 7/1970 | Adams | 501/105 |
| 3,541,193 | 11/1970 | Adams | 501/105 |
| 3,887,387 | 6/1975 | Sturhahn | 501/104 |
| 4,218,253 | 8/1980 | Dworak et al. | 501/97 |
| 4,298,385 | 11/1981 | Claussen et al. | 501/105 |
| 4,316,964 | 2/1982 | Lange | 501/105 |
| 4,322,249 | 3/1982 | Claussen et al. | 501/88 |
| 4,419,311 | 12/1983 | Claussen et al. | 501/105 |
| 4,421,861 | 12/1983 | Claussen et al. | 501/105 |

FOREIGN PATENT DOCUMENTS 2549652 11/1975 Fed. Rep. of Germany .
2751938 11/1977 Fed. Rep. of Germany .
2920795 5/1979 Fed. Rep. of Germany .

OTHER PUBLICATIONS

Claussen; N., "Fracture Toughness of $Al_2O_3$ with an Unstabilized $ZrO_2$ Dispersed Phase" J. Amer. Cer. Soc. Jan.–Feb., 1976, 59, pp. 49–51.

*Primary Examiner*—George F. Lesmes
*Assistant Examiner*—William M. Atkinson
*Attorney, Agent, or Firm*—Felfe & Lynch

[57] ABSTRACT

The present invention is concerned with a ceramic formed body comprising a ceramic matrix and at least one phase of ceramic incorporation material dispersed therein, characterized by a dense, microcrack-free ceramic base matrix and compressive zones incorporated therein which consist of a mixture of the base matrix material with unstabilized zirconium dioxide particles which are predominantly monoclinic at ambient temperature.

The present invention is also concerned with a process for the production of such ceramic formed bodies and with the use thereof as constructional elements in the hot region of heat engines.

12 Claims, 1 Drawing Figure

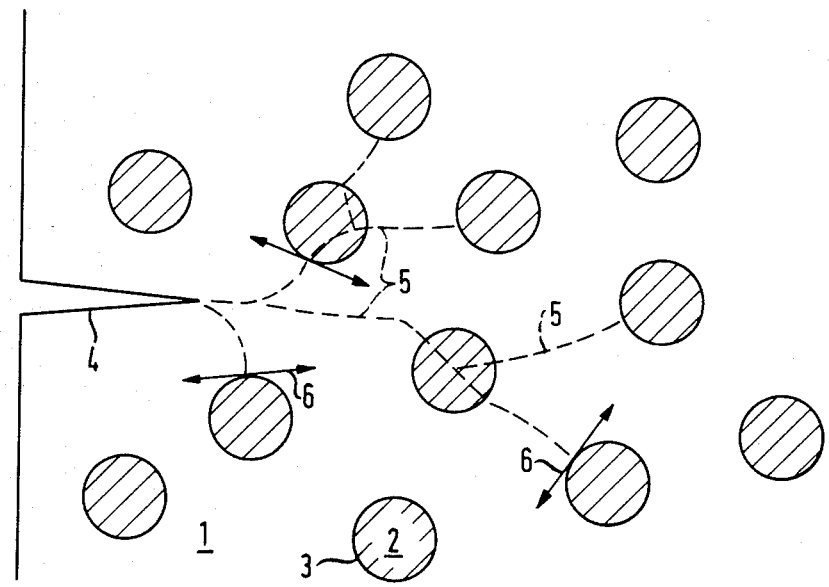

CERAMIC FORMED BODY WITH A HIGH CRACK ARRESTABILITY

The present invention is concerned with a ceramic formed body with a high crack arrest ability and thus with a high fracture strength comprising a ceramic matrix and at least one phase of ceramic incorporation material dispersed therein.

From Federal Rebublic of Germany Patent Specification No. 25 49 652, there is already known a ceramic formed body of high fracture strength which is permeated by very fine microcrack nuclei in high density and consists of a ceramic matrix and at least one phase of ceramic incorporation material dispersed therein, the ceramic incorporated material being present at the sintering temperature of the ceramic formed body and at ambient temperature in different enantiotropic solid modifications. On the basis of these properties, it possesses an improved thermal shock resistance and an improved impact strength with essentially the same good mechanical strength as the known ceramics.

Federal Republic of Germany Patent Specification No. 27 17 010 is also concerned with a ceramic formed body permeated by very fine microcrack nuclei in high density, which is a further improvement of the subject matter of Federal Republic of Germany Patent Specification No. 25 49 652, the ceramic matrix containing an additionally incorporated phase which, in turn, consists of a ceramic matrix and at least one phase dispersed therein of ceramic incorporation material which possesses a content of ceramic incorporation material different from the content of the base material. These ceramic formed bodies are produced by making spheroidal agglomerates with a definite content of ceramic incorporated material and coating these agglomerates with a material of the same kind but with a different content of ceramic incorporated material, whereafter the coated agglomerates are pressed and sintered or hot pressed.

However, there is still a need for engineering ceramic materials which, while having a high fracture strength, also possess a good ability for crack arrest and, at the same time, have a low thermal conductivity. The phase change of finely dispersed zirconium dioxide particles from the tetragonal to the monoclinic lattice modification can thereby be utilised in differing ways for improving the behaviour of engineering ceramic materials. Thus, for example, a transformation, induced in a field of stress, of very small (tetragonal) particles brings about a very high fracture toughness, i.e. a great mechanical strength, whereas larger particles, on the other hand, in the case of their spontaneous transformation, initiate microcracks which drastically increase the heat insulation property without, however, impairing the strength very much. Both properties are of decisive importance for the use of ceramic formed bodies in heat engines.

It is an object of the present invention to improve the previously known ceramic formed bodies in such a manner that, with increased strength, they make possible an increased ability to arrest cracks and make possible an increased heat insulation.

We have now found that this object can be achieved according to the present invention by incorporating compressive zones into a dense, microcrack-free base matrix, the compressive consisting of a mixture of the base matrix material with unstabilised zirconium dioxide particles which are preponderantly monoclinic at ambient temperature.

Thus, according to the present invention, there is provided a ceramic formed body comprising a ceramic matrix and at least one phase of ceramic incorporation material dispersed therein, which is characterised by a dense, microcrack-free ceramic base matrix and compressive zones incorporated therein of a material which consists of a mixture of the base matrix material with unstabilised zirconium dioxide particles which are preponderantly monoclinic at ambient temperature.

According to a preferred embodiment of the present invention, the compressive zone material is in the form of spheroidal compressive zones with a diameter in the range of from 10 to 100 $\mu$m. embedded in the base matrix.

According to another advantageous embodiment of the present invention, the base matrix contains embedded zirconium dioxide particles which, in contradistinction to the previously known ceramic formed bodies of the above-mentioned Patent Specifications, are present at ambient temperature in the tetragonal lattice modification instead of, as hitherto, in the monoclinic lattice modification, the particle size or grain size of these zirconium dioxide particles in the base matrix advantageously being less than 1 $\mu$m.

According to the present invention, the tetragonal form of the zirconium dioxide particles in the base matrix is achieved by comparatively long attrition (more than 2 hours and up to 12 hours) or by small stabilising additions of yttrium oxide ($Y_2O_3$), whereby, in the first case, the comparatively small particle size (0.1 to 0.5 $\mu$m.) is the cause for the retention of the tetragonal form, whereas, in the second case, the yttrium oxide partial stabilisation is responsible therefor so that, in this latter case, less effective grinding and mixing processes can be used.

The monoclinic lattice modification of the zirconium dioxide particles present in the compressive zones of the ceramic formed body according to the present invention is achieved by forming the compressive zone material from a powder mixture which has either been subjected to attrition for a short time (10 to 30 minutes) or has been formed in a ball mill so that a comparatively large particle size of the zirconium dioxide particles is obtained which thus are present at ambient temperature in the monoclinic form.

The ceramic formed body according to the present invention preferably contains, as base matrix material, aluminium oxide, mullite, spinel, silicon nitride ($Si_3N_4$), yttrium oxide ($Y_2O_3$) and/or zirconium dioxide partly stabilised with magnesium oxide and/or yttrium oxide.

According to the present invention, it is of especial advantage that the base matrix contains 1 to 25 volume % of zirconium dioxide particles which, more preferably, are partly stabilised with up to 2 mole % yttrium oxide.

The proportion of compressive zones in the base matrix is preferably from 5 to 30 volume %, the compressive zones thereby especially preferably containing 5 to 50 volume % of unstabilised zirconium dioxide particles.

An especially preferred embodiment of the present invention includes a ceramic formed body of the above-described type which displays a surface compressive stress produced by a stress-induced transformation of the tetragonal zirconium dioxide particles and thereby possesses a considerably increased strength. This stress-induced transformation can be brought about by grinding over of the surface of the ceramic formed body. In the case of the previously known ceramic formed bodies of the above-mentioned prior art, this is not possible since the zirconium dioxide particles contained therein are only present in the monoclinic lattice modification. Thus, in this regard, the present invention provides a considerable enrichment of the art.

Thus, the ceramic formed body according to the present invention has a duplex structure which includes uniformly distributed compressive zones which are formed by mixing spheroidal agglomerates of the compressive zone material with the powder of the base matrix material. Since not only the base matrix but also the compressive zones consist of a dispersion ceramic, for example of $Al_2O_3 + ZrO_2$ particles, the "interface" is only a stress zone boundary, i.e. the base matrix ($Al_2O_3$) is continuous and the incorporated zirconium dioxide particles only differ by size, proportion by volume and lattice modification and thus by their expansion behaviour. In this way, it is possible not only to reduce the heat conductivity but also to increase the fracture resistance so that it is possible to use these ceramic formed bodies for heat engines because of their good high temperature properties and their excellent heat insulation, as well as their good frictional behaviour. Therefore, the present invention is also concerned with the use of the ceramic formed bodies according to the present invention for this purpose of use, namely, in the hot region of heat engines.

The present invention also provides a process for the production of the above-defined ceramic formed bodies, which is characterised in that the base matrix material is dry mixed with agglomerates of the compressive zone material, the mixture is pressed into formed bodies by known powder metallurgical processes and these are either sintered without pressure or are sintered and subsequently hot pressed isostatically.

Preferably, use is made of an agglomerated base matrix material which has been formed from appropriate powdered components by spray drying, freeze drying or treatment in a tumbler mixer and the zirconium dioxide particles of which display a tetragonal form obtained by comparatively long attrition or by small stabilising additions of yttrium oxide.

According to the present invention, it is thereby advantageous to dry agglomerate or to spray dry the incorporated compressive zones from mixtures which have either been subjected to attrition for a short time (10 to 30 minutes) or have been produced in a ball mill so that the zirconium dioxide particles contained therein are present at ambient temperature in the monoclinic form. In the case of the above-described process procedure, a ceramic formed body is obtained the base matrix of which does not display any microcracks and contains tetragonal zirconium dioxide particles, the proportion by volume of the zirconium dioxide particles in the base matrix and in the compressive zones thereby being the same or different.

According to a preferred embodiment of the process according to the present invention, the surface of the sintered ceramic formed body is ground, the result of which is that the tetragonal particles are subject to a stress-induced transformation, surface compressive stresses thereby being produced which lead to a considerable increase of the strength of the material.

The ceramic formed body according to the present invention is characterised, in comparison with the previously known formed bodies of the above-discussed prior art, in that it displays an equally high fracture strength and stability but, in contradistinction to the previously known materials, simultaneously displays a high ability to arrest cracks (work of fracture) and a good thermal shock resistance. The zirconium dioxide particles in the cermaic formed body according to the present invention are thereby present at the sintering temperature and at ambient temperature in the base matrix in the same "enantiotropic" solid modification, namely, the tetragonal lattice modification, whereas in the compressive zones, in each case, different modifications prevail, namely, at the sintering temperature the tetragonal form and at ambient temperature the monoclinic form.

The present invention will now be described in more detail, with reference to the accompanying drawing which is a schematic representation of the construction and working principle of the ceramic formed body according to the present invention.

Thus, in a base matrix material 1, which consists of a zirconium dioxide-containing dispersion ceramic, there are incorporated spheroidal compressive zones 2 of a similar dispersion ceramic, the zirconium dioxide particles in the base matrix and in the compressive zones thereby differing by the particle size and/or the proportion of stabiliser and/or the proportion by volume. The interface 3 is not a true phase boundary but rather a stress zone boundary. In principle, the material of the base matrix and that of the compressive zones can also differ but the interfaces would represent too large, strength-reducing structural flaws. A crack 4 (for example a surface flaw or an internal structural fault) flaw, in the case of exceeding the critical stress concentration ($K_{IC}$) typical for the base matrix material, extends at its tip and gives rise to crack propagations 5. These crack propagations 5 cannot run perpendicular to the direction of main applied tensile stress but are deflected into the compressive zones 2 since these are surrounded within the base matrix by tangential tensile stresses 6. The sections of the main crack front are, therefore, first retained in the compressive zones until, after an additional external increase of load, which corresponds to a larger effective fracture toughness, a further crack elongation can take place. The repeated crack deflection in the direction of the pressure zones 2 results in a crack branching which brings about an R-curve behaviour, i.e. the ability to arrest cracks becomes greater with increasing crack elongation, an effect which especially favourably influences the thermal shock behaviour of the ceramic formed body according to the present invention.

The concept of the duplex structure construction according to the present invention makes possible, via the compressive zones, an increased ability to arrest cracks and thus a more favourable fracture behaviour of the ceramic formed body.

The following Examples are given for the purpose of illustrating the present invention.

EXAMPLE 1

A basic matrix material is prepared in the form of a powdered mixture of 85 volume % aluminium oxide with an average initial particle size of 0.5 μm. and of 15 volume % of zirconium dioxide with an average initial particle size of 0.3 μm. and the material subjected to attrition in water for 10 hours. Agglomerates of the base matrix material with diameters of from 5 to 40 μm. are then formed by spray drying.

As compressive zone material, there is used a powdered mixture of 80 volume % aluminium oxide with an average initial particle size of 0.5 μm. and of 20 volume % of zirconium dioxide with an average initial particle size of 3 μm. and the material is subjected to attrition for 10 minutes, a powdered material being obtained which contains zirconium dioxide particles with a particle size of 1 to 3 μm. This powder mixture is then dry formed in a tumbler mixer to give agglomerates with diameters in the range of from 60 to 100 μm.

Subsequently, 200 g. of the spray-dried agglomerates of the base matrix material are mixed with 40 g. of the agglomerates of the compressive zone material in a paddle mixer for 1 hour. The agglomerate mixture is pressed isostatically at 600 MPa and sintered in the air for 2 hours at 1530° C.

The four-point bending strength of ground-over samples is 430 MPa (base matrix material alone=520 MPa) and the material has a critical stress concentration $K_{IC}$ (ISB) of 7.4 MPa $\sqrt{m}$ (4.9 MPa $\sqrt{m}$), while the critical temperature difference ($\Delta T_c$) in the case of quenching in cold water is 350° C. (220° C.) (The values given in parantheses are for samples which have only been produced from the base matrix material alone.

A quenching in boiling water at 100° C. gives, in the case of a quenching temperature (up to 800° C.), no strength loss ($\Delta T_c^{100} > 800°$ C.), whereas the samples of the base matrix material alone give a $\Delta T_c^{100}$ of about 340° C.

The average particle size of aluminium oxide matrix of the sample bodies was 1 to 2 μm. and the zirconium dioxide particle size in the base matrix was 0.1 to 0.5 μm. and in the compressive zones was from 1 to 3 μm. (determined by means of a transmission electron microscope).

EXAMPLE 2

The procedure described in Example 1 is used but with the difference that the sample bodies are sintered for 2 hours at 1450° C. and subsequently, without encapsulation in argon, are hot isostatically pressed for 10 minutes at 1600° C. and at a pressure of 150 MPa.

Ceramic formed bodies are obtained with a bending strength of 530 MPa, a critical stress concentration $K_{IC}$ (ISB) of 7.5 MPa $\sqrt{m}$ and a critical temperature difference in cold water of 20° C. of $\Delta T_c^{20} \approx 370°$ C.

EXAMPLE 3

Using the procedure described in Example 1, 200 g. of the agglomerated base matrix material are mixed with 50 g. of the compressive zone material, pressed to give test bodies and sintered. The agglomerated base matrix material is thereby produced by spray drying an aqueous mixture of 75 volume % aluminium oxide (as in Example 1) and zirconium and yttrium acetate corresponding to 25 volume % ($ZrO_2 + 1$ mole % $Y_2O_3$) and subsequently calcining in air at 600° C., whereas the agglomerated compressive zone material is prepared according to the procedure described in Example 1.

The strength of the ground-over ceramic formed body samples is 580 MPa. The critical stress concentration $K_{IC}$ (ISB) is 6.8 MPa $\sqrt{m}$ and the $\Delta T_c^{20}$ is 330° C.

EXAMPLE 4

200 g. of agglomerated base matrix material are mixed with 60 g. of agglomerated compressive zone material according to the procedure of Example 1 and sintered for 4 hours at 1500° C.

The base matrix material used is identical with that of Example 3, whereas the compressive zone material is prepared by spray drying an aqueous mixture of 50 volume % aluminium oxide (as in Example 1) and 50 volume % zirconium dioxide (as in Example 1). The agglomerate diameter is from 10 to 40 μm.

The strength of the ceramic formed bodies obtained is 440 MPa, the critical stress concentration $K_{IC}$ (ISB) is 8.2 MPa $\sqrt{m}$ and the $\Delta T_c^{20} \approx 350°$ to 500° C. (a sharp drop of the strength is no longer recognisable). The heat conductivity of the material at ambient temperature is 5 W/mK.

EXAMPLE 5

150 g. of an agglomerated base matrix material, produced in a tumbler mixer from mullite (aluminium oxide/silicon dioxide in a weight ratio of 75/25; particle size about 0.3 μm.) are mixed with 30 g. of agglomerated compressive zone material (mixture of zirconium silicate and aluminium oxide) by the procedure described in Example 1 and the material is pressed. The diameter of the agglomerate particles is in the range of from 60 to 100 μm.

The formed bodies are first sintered for 2 hours at 1450° C. and subsequently for 2 hours at 1600° C. in the air. The strength of the ceramic formed bodies obtained is 220 MPa, the critical stress concentration $K_{IC}$(ISB) is 5.3 MPa $\sqrt{m}$ and the $\Delta T_c^{20}$ is 310° C., in comparison with 180° C. for formed bodies of pure mullite.

EXAMPLE 6

150 g. spray-dried base material of aluminium oxide-rich, pre-reacted spinel powder (54 mole % aluminium oxide and 46 (mole % magnesium oxide) are mixed, as in Example 1, with 30 g. compressive zone material of the same spinel composition and 25 volume % zirconium dioxide. The mixture is hot pressed in graphite matrices (diameter 35 mm.) at 1650° C. for 1 hour and subsequently kept for 12 hours in the air at 900° C.

The strength is 500 MPa, the $K_{IC}$ (ISB) is 5.5 MPa $\sqrt{m}$ and the $\Delta T_c^{20} \approx 270°$ C., compared with a $\Delta T_c^{20} 150°$ C. for pure spinel.

EXAMPLE 7

200 g. of base matrix material of zirconium dioxide with 2 mole % yttrium dioxide, which has been subjected to attrition for 4 hours with aluminium oxide milling balls (1 to 3 mm.) in alcohol, are mixed with 50 g. of compressive zone material as in Example 4, pressed isostatically and sintered in the air for 4 hours at 1480° C.

After the sinter process, >95% of the base matrix consists of tetragonal zirconium dioxide with a particle size of <1 μm. >90% of the compressive zones are monoclinic. The strength if 730 MPa and the $K_{IC}$ (ISB)=7.3 MPa $\sqrt{m}$.

EXAMPLE 8

150 g. of the agglomerated base matrix material is mixed with 20 g. of the agglomerated compressive zone material by the procedure according to Example 1 and hot pressed at 1750° C. according to the method of Example 6.

The base matrix material is thereby produced in a tumbler mixer from a mixture of silicon nitride ($Si_3N_4$) with 20 weight % aluminium oxide and 10 weight % yttrium oxide. The compressive zone material is produced in the same way but additionally contains 30 volume % zirconium dioxide.

The strength of the ceramic formed bodies obtained is 760 MPa, the critical stress concentration $K_{IC}$ (ISB) is 7.3 MPa $\sqrt{m}$ and the $\Delta T_c$ is >600° C.

We claim:

1. Ceramic formed body comprising a ceramic matrix and at least one phase of ceramic incorporation material dispersed therein, characterized by a dense, microcrack-free ceramic base-matrix, containing a dispersion of predominantly tetragonal zirconium dioxide particles with a particle size of less than 1 μm, and compressive zones incorporated in the base-matrix which zones consist of a mixture of the base matrix material with unstabilized zirconium dioxide particles which are predominantly monoclinic at ambient temperature.

2. Ceramic formed body according to claim 1, characterised in that the compressive zones are spheroidal and have a diameter of from 10 to 100 μm.

3. Ceramic formed body according to claim 1 comprising a base matrix material selected from the group consisting of aluminum oxide, mullite, spinel, silicon nitride ($Si_3N_4$), and zirconium dioxide partly stabilized with magnesium oxide, yttrium oxide ($Y_2O_3$) or mixtures thereof.

4. Ceramic formed body according to claim 1, wherein the proportion of the compressive zones in the base matrix is 5 to 30 volume %.

5. Ceramic formed body according to claim 1, wherein the compressive zones contain 5 to 50 volume % of unstabilised zirconium dioxide particles.

6. Ceramic formed body according to claim 1, wherein the compressive zones consist of zirconium dioxide with 0.5 to 1.5 mole % yttrium oxide ($Y_2O_3$) and the base matrix consists of zirconium dioxide with 2 to 4 mole % of yttrium oxide ($Y_2O_3$).

7. Ceramic formed body according to claim 1, characterised in that the base matrix material contains 1 to 25 volume % of zirconium dioxide particles.

8. Ceramic formed body according to claim 7, wherein the zirconium dioxide particles dispersed in the base matrix material are partly stabilised with up to 2 mole % yttrium oxide ($Y_2O_3$).

9. Process for the production of the ceramic formed body of claim 1 comprising the steps of dry mixing the base matrix material with agglomerates of the compressive zone material, pressing the mixture to give formed bodies for sintering and thereafter sintering the formed bodies to form the ceramic formed body.

10. Process according to claim 9, characterised in that an agglomerated base matrix material is used which has been formed from the corresponding powdered components by spray drying, freeze drying or treatment in a tumbler mixer.

11. Process according to claim 9, further comprising producing surface compressive stresses by grinding the surface of the sintered ceramic formed body, to increase the strength of the formed body.

12. The process of claim 9 further comprising hot pressing, isostatically, the sintered formed bodies.

* * * * *